United States Patent [19]

Black et al.

[11] 4,153,071
[45] May 8, 1979

[54] LIQUID APPORTIONING DEVICE

[75] Inventors: Brent C. Black; P. Larry Hill, both of Salt Lake City, Utah

[73] Assignee: Envirotech Corporation, Menlo Park, Calif.

[21] Appl. No.: 819,647

[22] Filed: Jul. 27, 1977

[51] Int. Cl.² ............................................. G05D 9/04
[52] U.S. Cl. ................................... 137/386; 137/263; 137/413; 137/577; 137/883
[58] Field of Search .................. 137/101.27, 122, 263, 137/386, 413, 571, 577, 861, 883, 885; 210/101, 121, 123, 134, 340

[56] References Cited

U.S. PATENT DOCUMENTS

| | | | |
|---|---|---|---|
| 424,596 | 4/1890 | Burns | 137/263 X |
| 1,935,642 | 11/1933 | Laughlin | 210/340 X |
| 2,625,175 | 1/1953 | Wilson | 137/577 |

FOREIGN PATENT DOCUMENTS 78313 6/1955 Netherlands ............................... 137/577

Primary Examiner—Robert G. Nilson
Attorney, Agent, or Firm—Michael J. Pollock; Robert E. Krebs

[57] ABSTRACT

A mechanism for selectively distributing liquid flow to at least two separate outlet conduits includes a tank for receiving liquid and at least two tubular members having bellows-like sections mounted in the tank in flow communication with the associated outlet conduits. Actuator devices are connected for selectively compressing or extending the bellows-like sections to determine the elevations of the mouths of the tubular members within, or above, the liquid in the tank to thereby control the flow through the outlet conduits.

6 Claims, 1 Drawing Figure

LIQUID APPORTIONING DEVICE

BACKGROUND OF THE INVENTION

Field of the Invention

The present invention relates to a mechanism for distributing liquid flow and, more particularly, to a mechanism for selectively and concurrently distributing liquid flow to two or more separate outlet conduits.

State of the Art

In handling flowing liquids, including slurries, the need can arise for selectively and concurrently apportioning or "splitting" the flow among a plurality of separate conduits. One instance where such a need may arise is in filtration operations in a municipal wastewater treatment plant where filter machines are operated in parallel in order to dewater the total sludge produced by the plant. Although the rate of flow to each of the filter machines should be constant for best results, that is often difficult to achieve because the inflow to the plant may vary substantially, say by as much as fifty percent.

In such applications, it is well known to distribute liquid flow to various streams by using so-called underwater valves. It is also known to utilize so-called "division boxes" whose sides comprise overflow weirs which are each associated with an individual discharge conduit. One drawback of division boxes, for instance, is that it is difficult to apportion or balance the flow over the various weirs.

OBJECTS OF THE INVENTION

A primary object of the present invention is to provide a mechanism for selectively and concurrently distributing liquid flow to at least two separate conduits.

Another object of the present invention is to provide an improved apportioning mechanism for distributing selected volumetric rates of liquid flow to two or more separate conduits.

BRIEF DESCRIPTION OF THE DRAWINGS

Various advantages and further objects of the present invention may be readily ascertained from consideration of the following detailed description and the appended drawing. The drawing, labeled "FIG. 1", is a side view of a mechanism according to the present invention; the mechanism is shown partially cut away and partially schematically. This drawing is offered by way of illustration only and not in limitation of the present invention, the scope of which is defined by the appended claims.

DETAILED DESCRIPTION OF THE PREFERRED EMBODIMENT

Figure 1:
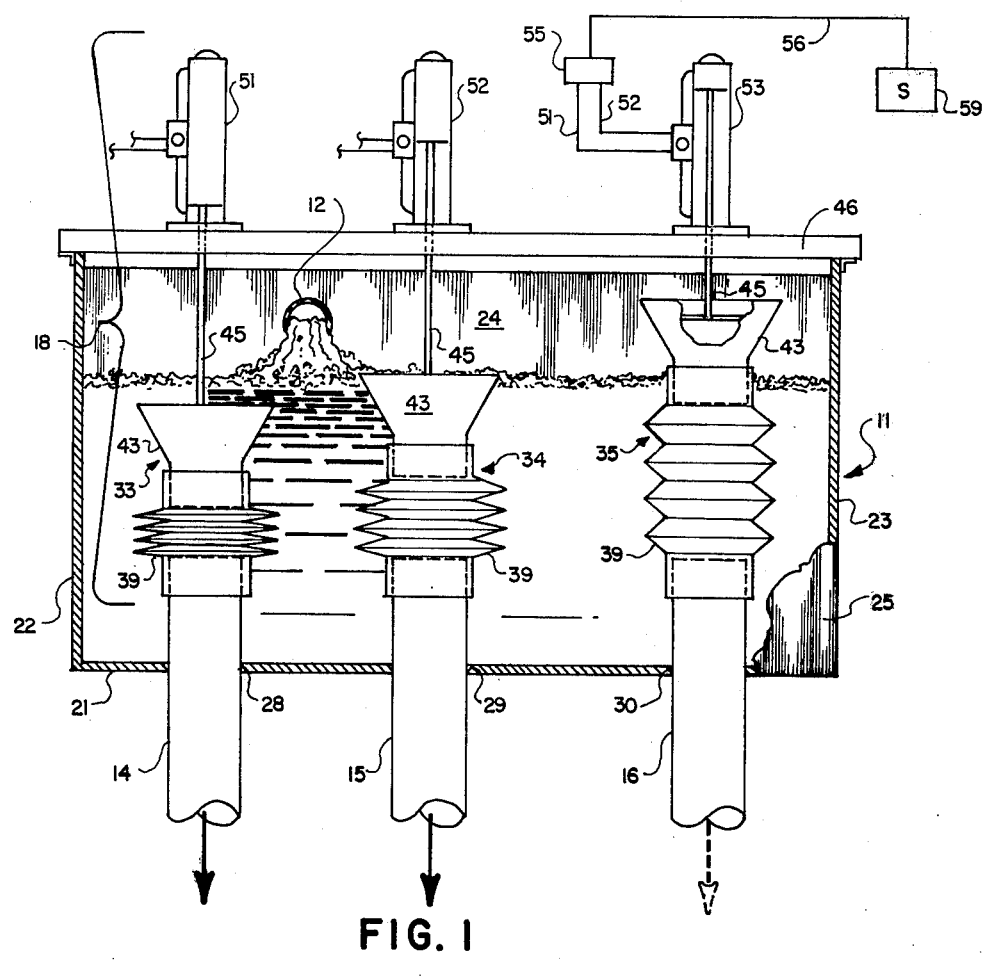

Generally speaking, the illustrated mechanism includes the following elements: a tank 11 for receiving liquid emitted from an inlet pipe 12; a plurality of separate outlet conduits 14, 15 and 16 connected to the tank in flow communication with the liquid therein; and means such as designated by the bracket 18 to selectively distribute liquid from the tank to the individual outlet conduits.

Speaking more particularly of the illustrated embodiment, the tank 11 is a box-like structure having a bottom wall 21 and upstanding sidewalls 22-25. (The forward sidewall 25 is partially cut away in the drawing to show the structure internal to the tank). Preferably, the tank is open to the atmosphere. It should be noted that the aforementioned inlet pipe 12 is mounted to extend through the sidewall 24 of the tank, but various other means could be provided to supply liquid to the tank.

In the illustrated embodiment, the aforementioned outlet conduits 14-16 are positioned to extend upward into the liquid in the tank 11 with their upper ends terminating a substantial distance below the surface of the liquid. Although those outlet conduits are shown as being sealingly mounted through apertures 28-30, respectively, formed in the bottom wall 21 of the tank 11, it should be recognized that the apertures for the outlet conduits could just as well be formed through one of the lower sidewalls of the tank.

Mounted within the tank 11 in generally upright positions are open-ended tubular members, generally designated 33-35, respectively, whose lower ends are sealingly connected in flow communication with the upper ends of the respective outlet conduits 14-16. According to the present invention, each of the tubular members includes a compressible bellows-like section 39 which allows the effective length of the tubular member to be selectively varied. In practice, the bellows-like sections 39 are flexible rubber boots or the like. Preferably, frusto-conical funnel-like members 43 are sealingly connected to the upper ends or mouths of each of the tubular members to admit liquid from the tank 11 into the tubular members without undue turbulence.

Across the top of the tank is mounted a beam 46 or similar structural means to stationarily support actuator devices 51, 52 and 53, which are associated with the tubular members 33-35, respectively. The actuator devices 51-53 are connected to the tubular members 33-35, respectively, to selectively compress or extend the bellows-like sections 39 to thereby determine the elevation of the upper ends of the tubular members within the body of liquid held in the tank 11. Each of the actuator devices can be understood to include a selectively positionable solenoid or, as illustrated schematically, a double-acting piston and cylinder mechanism operated by compressed air, hydraulic fluid or the like. It should be observed that the pistons of the actuator devices in the illustrated embodiment are fixedly connected, via rods 45, to the funnel members 43.

In operation, the rods 45 are reciprocated in a vertical direction by the actuator devices 51-53 so that the vertical elevations of the mouths of the funnel-like members 43 can be independently and selectively determined. The elevation of the mouths of the funnel-like members 43 within the liquid contained in the tank 11 in turn determines the flow into the respective outlet conduits 14-16. When any one of the funnel-like members is elevated above the liquid level in the tank 11, as is the funnel member to the far right in the drawing, there is of course no liquid flow into the associated outlet conduit.

One particularly advantageous application of the aforedescribed apportioning mechanism is in conjunction with gravity filters in water or wastewater treatment plants. Generally speaking, gravity filters comprise confined layers of sand, gravel or other granular matter through which liquid flows by gravity for purification. When the aforedescribed apportioning mechanism is utilized in combination with two or more such filters, each of the actuator devices is connected to a conventional sensor element via a conventional positioning device; this is illustrated in the drawing by the sensor element 59 connected to a positioning device which, in turn, is coupled to the actuator device 55 via pneumatic lines 51 and 53. Each sensor element is employed to sense the liquid level in an associated gravity filter. In operation, the positioning device to which a sensing element is connected acts upon signals from the sensing element to control the associated actuator to thereby determine the elevation of the mouth of the associated tubular member in the tank 11 and, hence, to control the liquid flow to the gravity filter wherein the sensing element is located.

We claim:

1. A mechanism for selectively and concurrently distributing liquid flow to at least two separate outlet conduits to apportion the liquid flow to devices such as gravity filters, said mechanism comprising:
   a. a tank for receiving liquid;
   b. first and second outlet conduits connected in flow communication with the liquid contained in said tank;
   c. first and second open-ended tubular members mounted in said tank in flow communication with said first and second outlet conduits, respectively said first and second tubular members each including a compressible, upwardly extending bellows-like section having an open upper end;
   d. first and second actuator means connected, respectively, to said first and second tubular members for selectively compressing or extending said bellows-like sections to independently determine the elevation of the upper ends of said tubular members within and above the liquid contained in said tank to determine the liquid flow into the associated outlet conduit; and
   e. first and second sensor means for sensing the level of liquid at a location remote from said tank and means connecting said first and second sensor means to said first and second actuator means, respectively, to activate said actuator means according to the level of liquid sensed by said sensor means to determine the flow into the associated outlet conduit.

2. A mechanism according to claim 1 further including first and second funnel-like members fixedly connected to the open upper ends of said first and second bellows-like sections, respectively.

3. A mechanism according to claim 2 wherein said first and second actuator means each comprises a fluid-operated piston-and-cylinder mechanism having a piston which is selectively positionable and whose piston rod is fixedly connected to the associated one of said first and second tubular members.

4. A mechanism according to claim 1 wherein said first and second actuator means each comprises a fluid-operated piston-and-cylinder mechanism whose piston is selectively positionable and is connected to the associated one of said first and second tubular members.

5. A mechanism according to claim 1 wherein said tank is a box-like structure having an open top.

6. A mechanism according to claim 1 wherein said connecting means includes a first positioning mechanism connected between said first sensor means and said first actuator means.

* * * * *